United States Patent
Mahdavieh

(10) Patent No.: US 7,613,316 B2
(45) Date of Patent: Nov. 3, 2009

(54) METHODS AND APPARATUS FOR DETECTING OBJECTS IN BAGGAGE

(75) Inventor: Yaghoub Mahdavieh, Palm Harbor, FL (US)

(73) Assignee: L-3 Communications Security and Detection Systems Inc., Woburn, MA (US)

( * ) Notice: Subject to any disclaimer, the term of this patent is extended or adjusted under 35 U.S.C. 154(b) by 611 days.

(21) Appl. No.: 10/896,753

(22) Filed: Jul. 22, 2004

(65) Prior Publication Data

US 2005/0036689 A1 Feb. 17, 2005

Related U.S. Application Data

(60) Provisional application No. 60/489,247, filed on Jul. 22, 2003.

(51) Int. Cl.
  *G06K 9/00* (2006.01)
  *G01N 23/04* (2006.01)

(52) U.S. Cl. .......................... 382/100; 378/57

(58) Field of Classification Search ............... 382/100, 382/199; 378/57, 4, 62
See application file for complete search history.

(56) References Cited

U.S. PATENT DOCUMENTS

| | | |
|---|---|---|
| 3,435,400 A | 3/1969 | Beckman |
| 4,036,211 A | 7/1977 | Veth et al. |
| 4,133,208 A | 1/1979 | Parlanti |
| D254,189 S | 2/1980 | Prosky |
| D268,333 S | 3/1983 | Kojima et al. |
| 4,444,990 A | 4/1984 | Villar |
| 4,539,648 A * | 9/1985 | Schatzki .................. 250/358.1 |
| 4,671,296 A | 6/1987 | Aitken |
| 4,798,055 A | 1/1989 | Murray et al. |
| 5,775,488 A | 7/1998 | Vaught |
| 5,803,603 A | 9/1998 | Schlueter |
| 5,834,641 A | 11/1998 | Sternal |
| 5,949,842 A * | 9/1999 | Schafer et al. ................. 378/4 |
| 6,000,845 A | 12/1999 | Tymkewicz et al. |
| 6,026,143 A * | 2/2000 | Simanovsky et al. .......... 378/57 |
| 6,049,623 A * | 4/2000 | Fuderer et al. .............. 382/131 |
| 6,195,444 B1 * | 2/2001 | Simanovsky et al. ........ 382/100 |
| 2004/0109603 A1* | 6/2004 | Bitter et al. ................. 382/154 |
| 2004/0245485 A1* | 12/2004 | Sari-Sarraf et al. ..... 250/559.06 |

OTHER PUBLICATIONS

Rafael et al. Digital Image Processing, Second Edition, 2002, by Prentice-Hall, Inc, pp. 134-135, and 577-580).*

* cited by examiner

*Primary Examiner*—John B Strege
(74) *Attorney, Agent, or Firm*—Wolf, Greenfield & Sacks, P.C.

(57) ABSTRACT

A method of detecting a presence or absence of subject matter of interest, for example, sheet explosives and/or other potential threat objects is provided by various local and/or global gradient analysis methods including determining characteristics of gradient information of regions in an X-ray image to determine if the regions are associated with subject matter of interest for which detection may be desired, for example, contraband, explosives and/or other prohibited or unauthorized material.

61 Claims, 11 Drawing Sheets

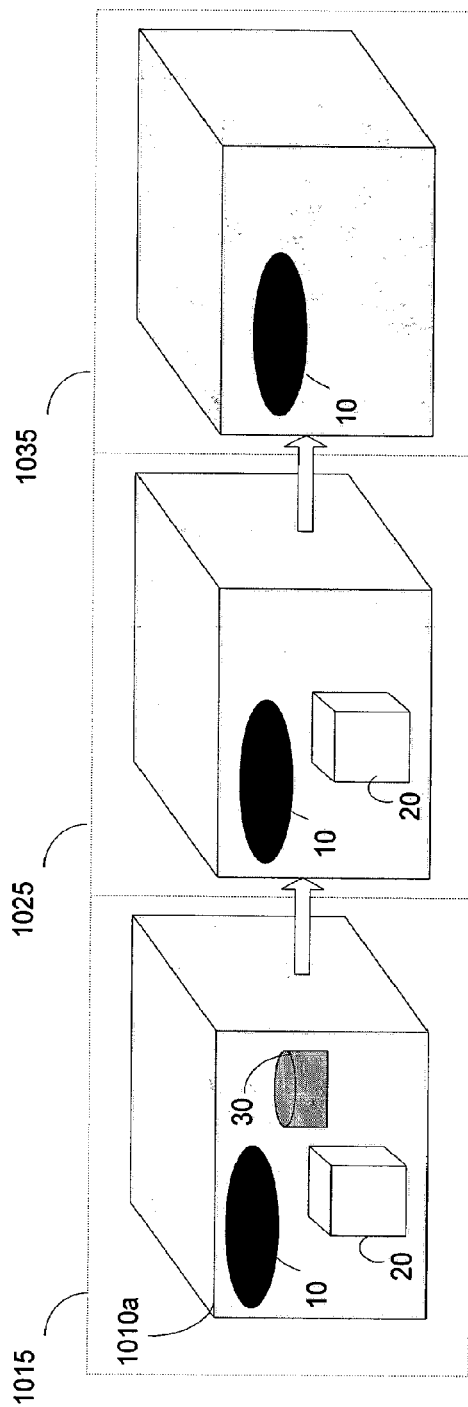
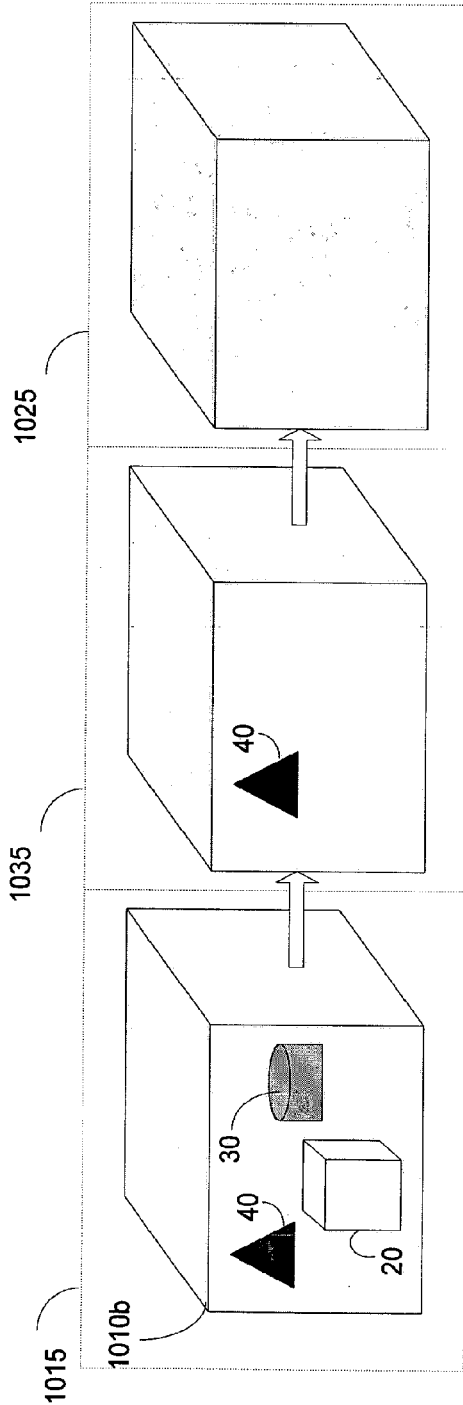
FIG. 10A
FIG. 10B

METHODS AND APPARATUS FOR DETECTING OBJECTS IN BAGGAGE

RELATED APPLICATIONS

This application claims the benefit under 35 U.S.C. §119 (e) of U.S. Provisional Application No. 60/489,247, filed Jul. 22, 2003, entitled "METHODS AND APPARATUS FOR DETECTING SHEET EXPLOSIVES," by Mahdavieh, which is incorporated by reference herein in its entirety.

FIELD OF THE INVENTION

This invention relates to X-ray inspection systems for security areas to detect contraband, explosives and/or other prohibited items in articles of baggage and/or other containers.

BACKGROUND OF THE INVENTION

A variety of X-ray systems may be employed in airports and other facilities requiring heightened security to scan baggage and other articles or containers for explosives, contraband and/or prohibited or unauthorized subject matter present in the baggage.

Various technologies have been used alone or in combination to increase the likelihood that prohibited items will be detected. For example, dual-energy X-ray detection facilitates determining the atomic number of certain materials and facilitates detecting certain materials that may be hidden within or covered by generally higher density materials. Nuclear Quadruple Resonance (NQR) techniques have been employed to detect specific compounds (e.g., nitrogen based compounds) often present in explosives such as plastic explosives. In general, these techniques are used to supplement various X-ray scanning techniques, such as X-ray Computed Tomography (CT).

X-ray scanning generally includes exposing an article, such as baggage, to electromagnetic radiation and detecting the radiation penetrating the baggage. As the radiation passes through the object, it is absorbed at varying levels by the objects, material and structures within the baggage. Upon exiting the baggage, the radiation impinges on a detector with an intensity related to the attenuation of the radiation caused by various materials comprising the contents of the baggage. By detecting radiation after it has penetrated the baggage, the various absorption characteristics of the material inside the baggage may be obtained.

By applying the radiation at various angles, the values of attenuated radiation incident on the detector can be back-projected to compute an image of a cross-section of the baggage. By repeating the procedure at different locations of the baggage, a number of cross-sections may be generated and correlated to form a 3D image of the baggage. The term "baggage" refers generally to any article having a volume that can contain and/or conceal any of various items or materials and may include, but is not limited to, luggage, packages, bags, boxes, cases, cargo containers or any other vessel having a carrying capacity.

Recent heightened security measures have placed stringent requirements on inspection systems. For example, facilities having baggage security checks, and particularly airports, are moving towards implementing 100% inspection of baggage. In an airport, for example, the shear quantity of passenger baggage places strict throughput constraints on an inspection system. Such constraints may not only prohibit baggage from being manually examined, but may also severely limit operator inspection of images generated by a CT scanner or other X-ray device.

To alleviate throughput bottlenecks that may result from manual inspection, various image processing techniques, recognition algorithms and/or statistical analysis tools have been employed to facilitate automatically analyzing image data generated by an X-ray inspection system to detect prohibited items hidden or contained within an article of baggage.

The United States, the Federal Aviation Administration (FAA) and the Transportation Security Administration (TSA) have established certification standards for automatic detection procedures implemented in an X-ray inspection system. For example, in order for an inspection system to be certified, the system must demonstrate both an acceptable detection rate and an acceptable false alarm rate. However, detection rates and false alarm rates are often in competition. As the detection rate increases, so typically does the false alarm rate. In fact, evidence indicates that incremental increases at higher detection rates may produce disproportionately larger increases in false alarm rates. Previous certification standards generally required an inspection system to perform at a particular detection rate and false alarm rate for items or material meeting or exceeding a specified mass (known as "100% threat weight").

Recent certification standards may require the same performance but for items having 75% of the threat weight threshold. This stricter measure may cause many conventional detection methods to have unacceptable detection rates and/or false alarm rates. In addition, incremental improvements to conventional detection methods may suffer from a larger and often unacceptable increase in false alarm rates.

Accordingly, many automatic detection methods capable of performing acceptably under previous certification procedures and mandates fail to meet the standards requested by the government and government agencies. The stricter requirements have had a particularly harsh effect on conventional detection methods with respect to a specific class of explosives known as sheet explosives.

Explosives can generally be divided into two main categories; bulk explosives and sheet explosives. Bulk explosives are typically more readily detected by conventional automatic detection methods. For example, bulk explosives tend to have mass distributed more uniformly over three dimensions. In contrast, sheet explosives have a characteristic "sheet-like" appearance and tend to have mass distributed over two dimensions while a third dimension (i.e., a depth or thickness) is generally very small. The characteristically thin dimensions of sheet explosives make detection of such material difficult for conventional automatic detection methods, particularly under the new 75% threat weight requirement.

Accordingly, conventional automatic detection systems may be inadequate to meet requirements established by recent security measures. In addition, improvements to conventional automatic detection methods are likely to incur unacceptable false alarm rates.

SUMMARY OF THE INVENTION

One embodiment according to the present invention includes a method of detecting a presence or an absence of subject matter of interest in an article of baggage from at least one image of the article of baggage, the method comprising acts of obtaining gradient information of at least a portion of the at least one image, determining at least one characteristic of the gradient information, and determining whether the portion of the at least one image is associated with the subject matter of interest based on the at least one characteristic.

Another embodiment according to the present invention includes a method of segmenting at least one image of an article of baggage into a first set of objects representing potential threat material within the baggage, the method comprising acts of obtaining a region of interest having a plurality of voxels from the at least one image, eliminating voxels from the plurality of voxels based on an intensity of each of the plurality of voxels and based on at least one characteristic of first gradient information of a neighborhood of each voxel, forming a first set of voxels from voxels of the plurality of voxels that were not eliminated, and grouping together connected voxels from the first set of voxels to form the first set of objects.

Another embodiment according to the present invention includes a method of reducing false alarms in detecting subject matter of interest in at least one article of baggage from at least one image of the at least one article of baggage, the method comprising acts of segmenting the at least one image into a first set of objects based at least on voxel intensity, eliminating objects from the first set of objects based on first gradient information obtained from each respective object to form a second set of objects, each object in the second set of objects having a plurality of voxels, and eliminating voxels from the plurality of voxels based on second gradient information obtained from a neighborhood of each respective voxel to form a third set of objects.

Another embodiment according to the present invention includes a computer readable medium encoded with a program for execution on at least one processor, the program, when executed on the at least one processor, performing a method of detecting a presence or an absence of subject matter of interest in an article of baggage from at least one image of the article of baggage, the method comprising acts of obtaining gradient information of at least a portion of the at least one image, determining at least one characteristic of the gradient information, and determining whether the portion of the at least one image is associated with the subject matter of interest based on the at least one characteristic.

Another embodiment according to the present invention includes an apparatus adapted to detect a presence or an absence of subject matter of interest in an article of baggage from at least one image of the article of baggage, the apparatus comprising at least one input adapted to receive the at least one image, and at least one controller, coupled to the at least one input, the at least one controller adapted to obtain gradient information of at least a portion of the at least one image, determine at least one characteristic of the gradient information, and determine whether the portion of the at least one image is associated with the subject matter of interest based on the at least one characteristic.

BRIEF DESCRIPTION OF THE DRAWINGS

FIG. 10A illustrates a method of using local and global gradient analysis in combination with a conventional detection method in order to reduce false alarm rates, in accordance with one embodiment of the present invention;

FIG. 10B illustrates another method of using local and global gradient analysis in combination with a conventional detection method in order to reduce false alarm rates, in accordance with one embodiment of the present invention.

DETAILED DESCRIPTION

Figure 1:
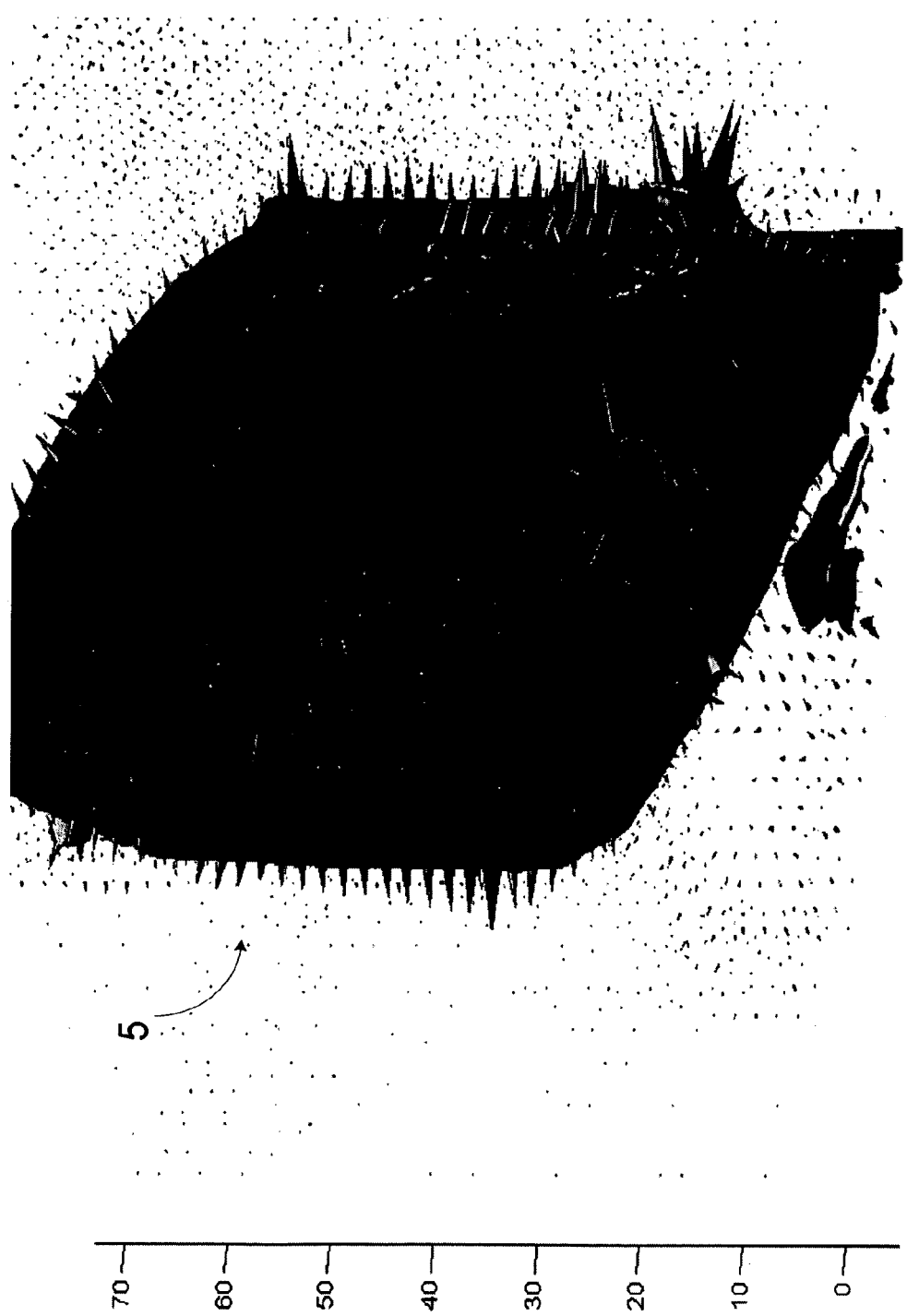
FIG. 1 illustrates a portion of an image including a sheet explosive, wherein a gradient field of the portion of the image has been computed and superimposed on the image of the sheet explosive.

Baggage inspection throughput, high detection rates and low false alarm rates place stringent requirements on an automatic inspection system. Increasing detection rates often correspond to increasing the false alarm rates to an unacceptable level. In order to improve the ability of an automatic detection method to discriminate between true positives and false positives, either the data on which an algorithm operates must improve (e.g., by providing higher resolution image data), or the detection algorithm must be enhanced, improved or fundamentally changed.

However, providing increased resolution image data may require expensive equipment and may be undesirable due to high costs. In addition, generating 3D X-ray image data is time consuming and computationally intensive such that generating high resolution data may jeopardize throughput. For example, a bag typically has to be inspected within 6 seconds to meet the requirements mandated by the TSA. Accordingly, increasing the resolution to the extent necessary to improve an existing method may be throughput and/or cost prohibitive.

Accordingly, in order to implement recent security measures, it is desirable to have fast and reliable inspection systems implementing accurate automatic detection means for a wide variety of objects and materials including items such as sheet explosives.

Some conventional automatic detection methods have approached the problem of detecting sheet explosives by identifying the geometry of scanned objects and attempting to categorize the characteristic shape of sheet explosives. Such techniques rely on dimensional information derived from the underlying X-ray images. However, X-ray images convey density information (e.g., intensity values expressed in Hounsfield units related to the density ($\rho$) of a material) and not shape information. Techniques that extract dimensional information or geometry from density information are prone to error and typically add significant noise to a detection method (particularly when the geometry of scanned objects is the principal measure in detecting and identifying its characteristics).

Various aspects of the present invention derive from Applicant's appreciation that distinguishing characteristics of certain subject matter of interest may be obtained from analysis of the native image content (e.g., density related information). For example, Applicant has developed various automatic detection methods that include analysis of intensity variation in an X-ray image, and in particular, Applicant has developed various gradient analysis methods for distinguishing certain classes of threat objects and/or prohibited subject matter in X-ray images acquired from inspections systems incorporating an X-ray scanner.

In one embodiment according to the present invention, gradient information may be used to distinguish between various objects within an article of baggage. For example, certain characteristics may be obtained from the gradient information of an X-ray image to distinguish threat objects, such as explosives, from other innocuous and/or non-threat objects contained within the baggage.

The term "gradient information" refers generally to a measure of how image data (i.e., intensity values) changes as a function of space. For example, gradient information may include derivative information of a portion of an image. In general, gradient information refers to the gradient of an image as it relates to the native content of an image. For example, the pixels or voxels in an X-ray image typically carry absorption rate information related to the density or Z-number of scanned material. As such, gradient information of an X-ray image generally relates to density gradients and various properties of density gradients. The term "characteristic" refers generally to a trait, property and/or feature of a computation, object and/or subject matter of interest. For example, a characteristic of a gradient field may include, but is not limited to, its average direction, one or more principal directions of variation, uniformity, magnitude, etc. In general, a characteristic describes a property or trait that tends to distinguish, in part, a particular class of objects from other objects not belonging to the class.

Applicant has identified and appreciated that sheet explosives often exhibit distinct gradient characteristics. In one embodiment, in particular, a gradient field of regions in an image corresponding and proximate to sheet explosives are employed to distinguish sheet-like objects from non-sheet objects. A gradient field may be defined as a map that assigns each point in a region of space a vector function equal to the gradient of an initial function $f(x, y, z)$. For example, the function $f(x, y, z)$ may describe the intensity distribution of a scanned article or portion of a scanned article. That is, $f(x, y, z)$ may be a 3D X-ray image.

In general, an image is a discrete scalar field having values indicative of a particular measurement. For example, the scalar values (i.e., pixels in a 2D image and voxels in a 3D image) in an X-ray image indicate the degree to which material in the corresponding region of space attenuates electromagnetic radiation. The term "intensity" will be used herein to describe the values of pixels or voxels comprising an image.

The gradient of a function $f(x, y, z)$ may be described as a vector field wherein the components of each vector in the field represent the first partial derivative of function $f(x, y, z)$ with respect to x, y, and z. For example, the gradient of a function $f$ may be represented as follows:

$$\nabla f = \left(\frac{\partial f}{\partial x}, \frac{\partial f}{\partial y}, \frac{\partial f}{\partial z}\right), \qquad (1)$$

where, $\nabla f$ is the gradient of the function $f$ (e.g., a portion of an X-ray image), $$\frac{\partial f}{\partial x}$$

is the first order partial derivative of function $f$ with respect to x, $$\frac{\partial f}{\partial y}$$

is the first order partial derivative of function $f$ with respect to y, and $$\frac{\partial f}{\partial z}$$

is the first order partial derivative of function $f$ with respect to z.

The magnitude of the gradient may be calculated as follows:

$$\|\nabla f\| = \sqrt{\left(\frac{\partial f}{\partial x}\right)^2 + \left(\frac{\partial f}{\partial y}\right)^2 + \left(\frac{\partial f}{\partial z}\right)^2}. \qquad (2)$$

The partial derivative of a discrete function $f$ (e.g., an X-ray image or portion of an X-ray image) may be computed by any of various methods suitable for indicating how the intensity is changing as a function of space including, but not limited to, computing central differences, filtering techniques such as applying a Sobel or Gaussian operator, or any other method suitable for indicating how the intensity values are changing over a portion of the image, for example, in each of the x, y and z directions. Applicant has appreciated that such gradient information may contain characteristics that can discriminate between some threat and non-threat material.

FIG. 1 illustrates a CT image of a sheet explosive 5 for which the gradient field has been computed. The gradient field vectors are depicted as cones which are oriented along the direction of the gradient at a particular voxel and have a size proportional to the magnitude of the gradient. As shown, the cones predominantly align in a direction perpendicular to the planar surface of the sheet explosive and have a relatively uniform magnitude. Stated differently, one characteristic of the gradient field in FIG. 1 is that it generally exhibits a predominant gradient direction. Another characteristic may include the substantial uniformity in gradient magnitude.

Figure 2:
FIG. 2 illustrates a portion of an image including a sheet explosive and other non-threat objects, wherein a gradient field of the portion of the image has been computed and superimposed on the image of the sheet explosive and other non-threat objects.

FIG. 2 illustrates a CT image of a sheet explosive 5' having non-sheet and/or non-threat items 7 proximate to the sheet explosive 5'. The gradient field vectors of the various objects are depicted as described in FIG. 1. As shown, the gradient field of a sheet explosive tends to be relatively uniform. A curved sheet (not shown) would tend to have smooth gradient transitions. In contrast, non-sheet objects are generally characterized by irregular gradient fields, both in magnitude and in direction.

Figure 3:
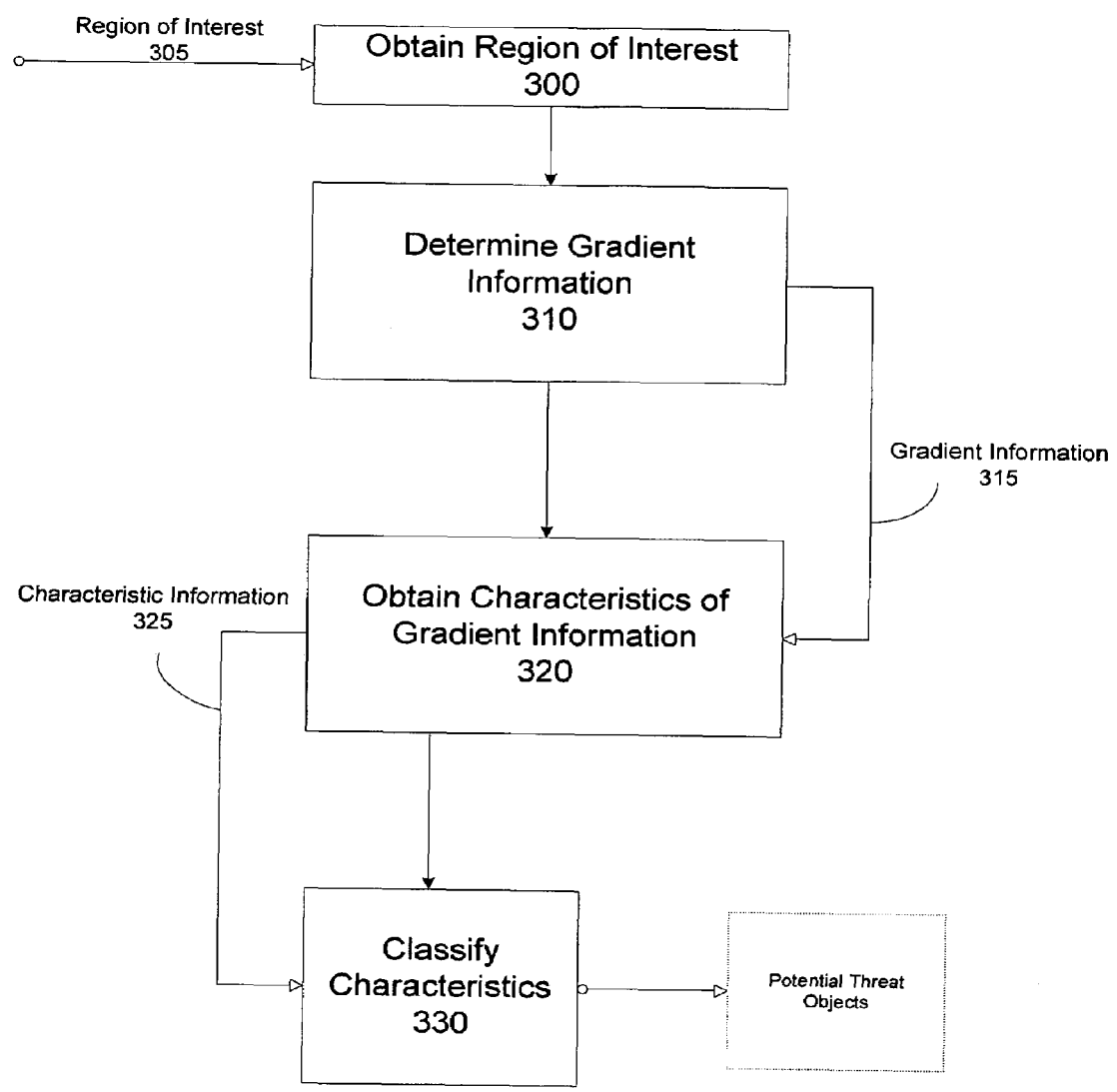
FIG. 3 illustrates a method for discriminating a class of objects from other objects not belonging to the class, in accordance with one embodiment of the present invention.

Applicant has identified and appreciated that various characteristics of gradient information may facilitate distinguishing sheet objects from non-sheet objects in X-ray images of baggage. FIG. 3 illustrates a method in accordance with one embodiment of the present invention for identifying one or more threat objects in a region of interest of an X-ray image. The method includes obtaining and analyzing characteristics of gradient information determined for the region of interest.

In step 300, a region of interest 305 is acquired. Region of interest 305 may be a set of voxels from a portion or an entire 3D X-ray image. The set of voxels may be contiguous, connected, taken from unconnected locations in the image or both. While region of interest 305 will be described in connection with image data from a 3D X-ray, it should be appreciated that the region of interest may be image data from a 2D image or an image having more than 3 dimensions. Operations and methods related to voxels can be applied likewise to pixels.

In step 310, gradient information 315 is obtained from the region of interest. Gradient information 315 may be any measure, computation or transformation of the region of interest 305 that indicates how intensity values are changing as a function of space and may include derivative or difference information of any order, filter outputs, etc. For example, determining gradient information 315 may include computing $\nabla f$ where the function $f$ is the discrete set of pixels or voxels in region of interest 305.

Determining gradient information 315 may include obtaining higher order information, further manipulating the gradient of the region of interest or both. For example, gradient information 315 may include a covariance matrix of the gradient of the region of interest 305. Alternatively, or in addition to, gradient information may include the Hessian of the region of interest. Moreover, characteristics of the gradient itself, for example, magnitude and/or direction characteristics may be analyzed. In general, any of various gradient analysis, manipulation and/or transformation that facilitate obtaining distinguishing characteristics may be used, as the invention is not limited in this respect.

In step 320, characteristic information 325 is determined based on gradient information 315 obtained in step 310. In general, the type of characteristic information obtained may depend on the type, composition and/or arrangement of the material and/or subject matter being detected. For example, Applicant has developed various methods that extract characteristics based on the appreciation that essentially planar sheet explosives exhibit generally uniformly varying gradients and curved sheet explosives exhibit smoothly transitioning gradients. Such characteristics of sheet-like objects can be distinguished from non-sheet-like objects which tend to have less uniform and often highly irregular gradient variation.

In one embodiment, the principal directions of variation of gradient information 315 are computed to obtain characteristic information of the gradient field of the region of interest. However, other characteristics of the gradient information may be used to distinguish other types of objects and/or to distinguish sheet like objects. For example, statistics on the magnitude and/or direction of the gradient field vectors may be analyzed in order to determine characteristics of the gradient information.

In step 330, characteristic information 325 is analyzed in order to determine whether region of interest 305 or any portion of region of interest 305 belongs to a class of objects the detection method is designed to identify. For example, characteristic information 325 may be analyzed to determine which portion, if any, of region of interest 305 is likely to represent image information of one or more sheet explosives. In one embodiment, the principal directions of variation are compared in order to distinguish sheet explosives from non-sheet and/or non-threat objects in an article of baggage.

In general, classifying the characteristic information may depend on the type of characteristic information obtained. For example, various likelihood measures may be used to classify statistical data of the gradient field. Various thresholding techniques may be employed to remove voxels that do not meet certain gradient vector requirements. Eigenvalue comparisons may be used to distinguish principal characteristics of an object's gradient information, as described in further detail below.

Figure 4:
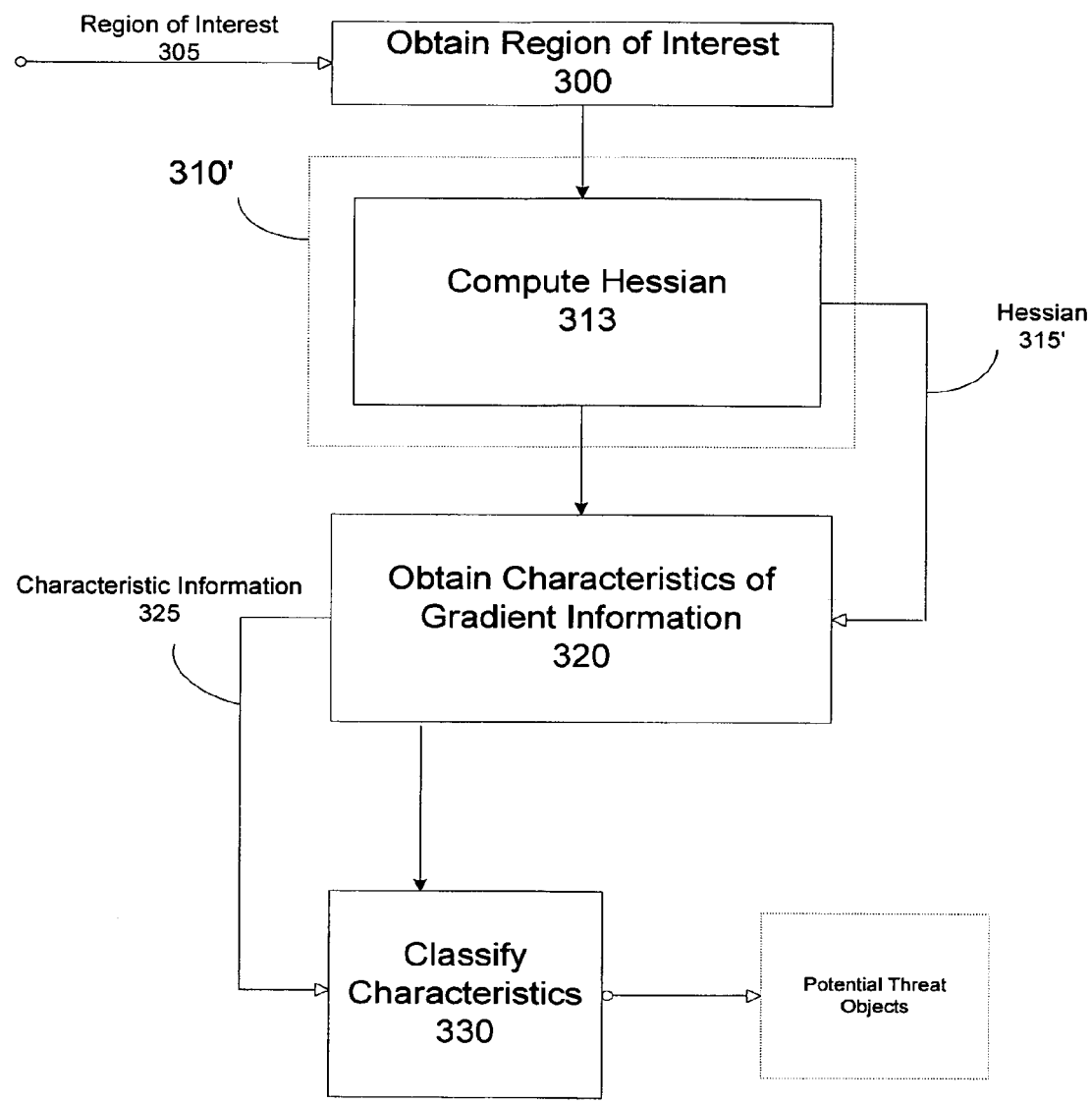
FIG. 4 illustrates a method of obtaining gradient information from an X-ray image in the general detection framework of FIG. 3, in accordance with one embodiment of the present invention.

FIG. 4 illustrates a method in accordance with one embodiment of the present invention including the computation of second order partial derivatives of a region of interest 305 in order to obtain characteristic information about the region of interest. In particular, FIG. 4 illustrates one embodiment of a technique for obtaining gradient information in the general detection framework described in connection with FIG. 3.

Second order partial derivatives may be employed to measure how the gradient of a region of interest is changing as a function of space. For example, in step 313, gradient information related to region of interest 305 may be obtained by forming the so-called Hessian matrix at each voxel in the region. The Hessian matrix may be represented as follows:

$$H = \begin{pmatrix} f_{xx} & f_{xy} & f_{xx} \\ f_{yx} & f_{yy} & f_{yz} \\ f_{zx} & f_{zy} & f_{zz} \end{pmatrix}, \text{ where, } f_{xx} = \frac{\partial^2 f}{\partial x^2}, \quad (3)$$

$$f_{xy} = \frac{\partial^2 f}{\partial x \partial y}, f_{xz} = \frac{\partial^2 f}{\partial x \partial z}, \text{ etc.}$$

As discussed above, sheet explosives, for example, tend to have characteristic gradient variation. Accordingly, the Hessian may be analyzed, for example, by obtaining its principal components (e.g., its eigenvectors and associated eigenvalues) as described in connection with FIG. 6 in order to discriminate sheet objects from non-sheet objects.

However, the Hessian requires second order partial derivatives to be calculated. In general, each additional partial derivative of a discrete system tends to increase the error in the computations. That is, higher order derivatives tend to be relatively noisy. This may be due to various factors including the discretization and quantization of X-ray images. Increasing the resolution of an image may reduce these types of errors, but high resolution images are computationally expensive and may be limited by the equipment used in a particular inspection system. In addition to cost and impracticability, high resolution images may frustrate the throughput of an inspection system.

Figure 5:
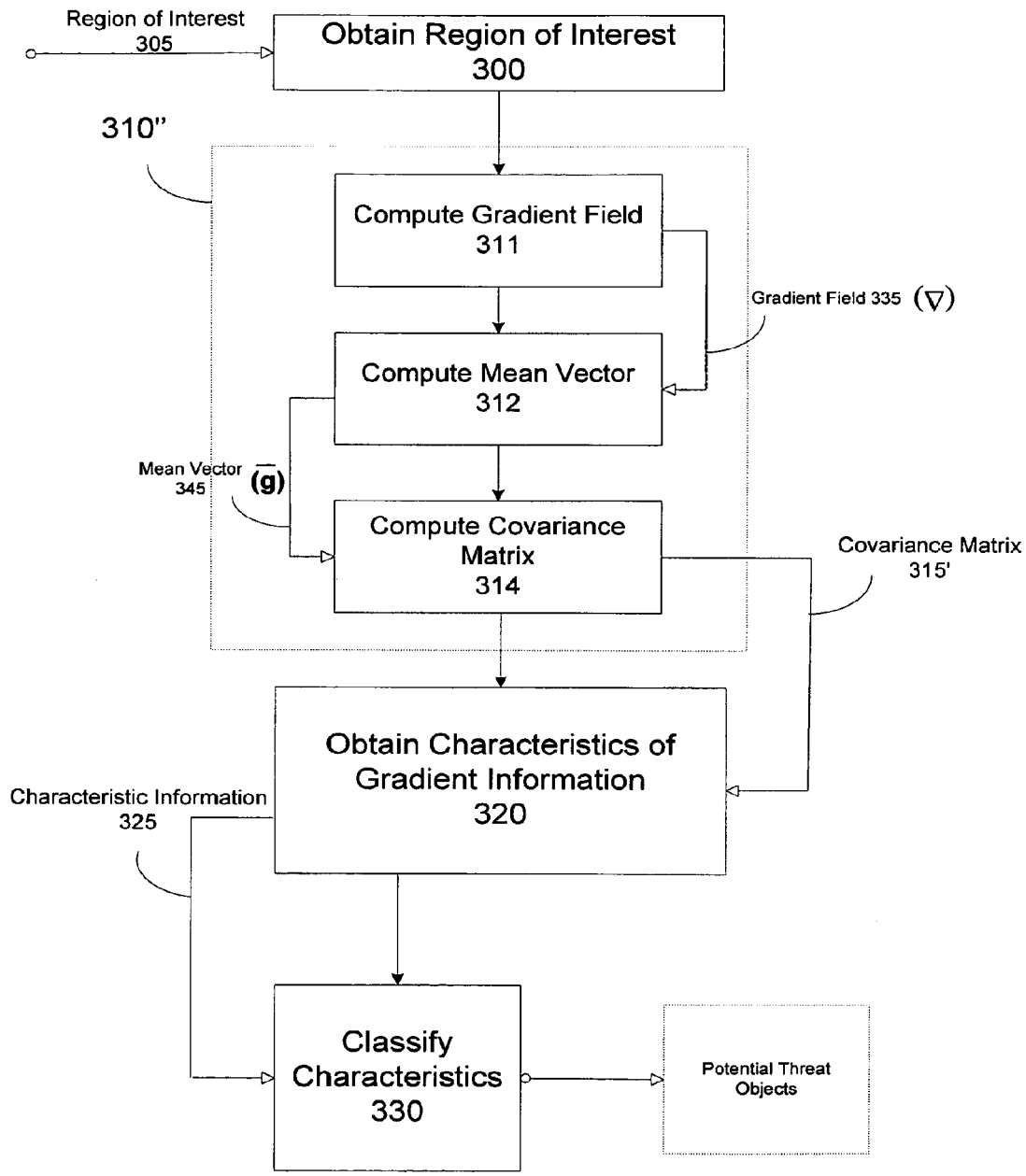
FIG. 5 illustrates another method of obtaining gradient information from an X-ray image in the general detection framework of FIG. 3, in accordance with one embodiment of the present invention.

FIG. 5 illustrates another embodiment of a method for obtaining gradient information from which characteristics may be derived and compared to characteristics of a particular object or class of objects of interest. The method described below may also be used to obtain gradient information in the general framework described in connection with FIG. 3. In step 311, the gradient of region of interest 305 may be computed. For example, the gradient may be computed according to Equation 1, such that each voxel in region of interest 305 has an associated vector, referred to as the gradient field vector, having a component for each dimension of the image. For example, in a 3D image, after gradient field computation, each voxel location in the region of interest would include an associated gradient field vector having an x, y and z component indicating the gradient along the respective x, y and z axes.

Accordingly, a gradient field 335 of the region of interest may be computed.

In step 312, a mean vector 345 of the gradient field 335 may be computed. The mean vector refers generally to a mean of the gradient field vectors in gradient field 335 and may be computed by taking the average of each vector component of the gradient field vectors over the region of interest. For example, the mean vector 345 for gradient field 335 acquired from a 3D X-ray image may be represented as follows:

$$\bar{g} = \left( \frac{1}{n} \sum_{i=1}^{n} x_i, \frac{1}{n} \sum_{i=1}^{n} y_i, \frac{1}{n} \sum_{i=1}^{n} z_i \right), \quad (3)$$

where x, y and z are the respective components of the gradient vectors and n is the number of gradient vectors in the gradient field of the region of interest, for example, n may equal the number of voxels in region of interest 305. It should be appreciated that the mean vector may have more or fewer than three components depending on the dimensionality of gradient field 335. For example, the components of a gradient field vector may relate to other "features" besides a spatial dimension such as measurements from other inspection modalities.

For example, NQR values, dual energy measurements, etc., may be included as components in a gradient field vector.

In step 314, a covariance matrix 315" for gradient field 335 may be computed. The covariance matrix 315" may be employed as an indication of how the gradient field varies over region of interest 305. Covariance matrix 315" may be determined as follows:

$$A = \begin{bmatrix} \sum_{i=1}^{n}(x_i - \bar{x})^2 & \cdots & \sum_{i=1}^{n}(x_i - \bar{x})(z_i - \bar{z}) \\ \vdots & \ddots & \vdots \\ \sum_{i=1}^{n}(x_i - \bar{x})(z_i - \bar{z}) & \cdots & \sum_{i=1}^{n}(z_i - \bar{z})^2 \end{bmatrix}, \quad (4)$$

While the above covariance matrix A is illustrated as a 3×3 matrix, it can be of any size. For example, matrix A may include covariance information related to vectors of any length. Stated differently, a covariance matrix may be determined from gradient field vectors of any dimensionality.

It should be appreciated that covariance matrix 315" includes information related in part to the information in Hessian matrix H. That is, covariance matrix 315" relates to how the gradient field varies over the region of interest 305. However, the covariance matrix does not require second order partial derivatives to be computed. Accordingly, by employing covariance matrix 315", gradient variation characteristics may be determined while errors may be bound substantially to that incurred by first order derivative computations.

Figure 6:
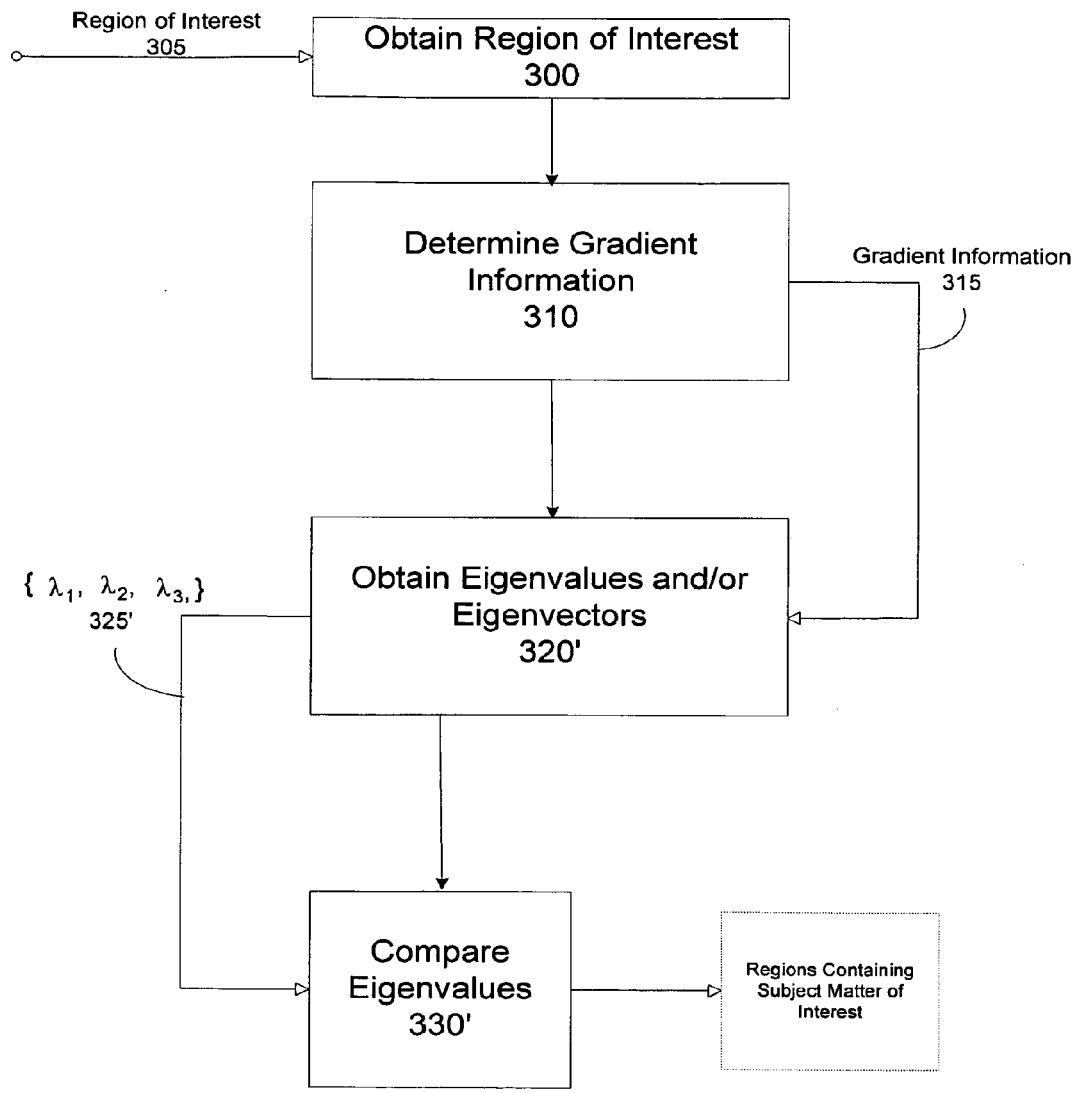
FIG. 6 illustrates a method of obtaining and evaluating characteristics of gradient information of a portion of an X-ray image in the general detection framework of FIG. 3, in accordance with one embodiment of the present invention.

FIG. 6 illustrates one embodiment according to the present invention of techniques for obtaining and comparing characteristics of acquired gradient information, for example, characteristics of the Hessian matrix discussed in connection with FIG. 4 and/or the covariance matrix described in connection with FIG. 5. As discussed in the foregoing, certain objects of interest such as sheet explosives often exhibit characteristic gradient fields. Distinguishing characteristics of the gradient field, once obtained, may be used to identify particular objects of interest (e.g., threat objects) from other objects (e.g., non-threat objects).

One or more characteristics of gradient information of a region of interest may be obtained in a number of ways and may depend on the particular features of the gradient that have been identified as capable of discriminating a class of objects. In one embodiment, the principal directions or axes of variation of the gradient information of a region of interest is determined. Applicant has identified and appreciated that the relationship between principal directions of variation may be used to distinguish certain objects of interest, for example, sheet explosives.

The principal directions of variation may be computed in any number of ways including determining the eigenvalues associated with eigenvectors of gradient information 315. For example, the Hessian matrix computed in step 310' or the covariance matrix computed in step 310" may be decomposed to obtain the characteristic values (e.g., eigenvalues) and the associated characteristic directions (eigenvectors) of the gradient information.

Eigenvalues and eigenvectors of a matrix can be determined in various ways, for example, by solving the relationship:

$$Au = \lambda u \quad (5),$$

where A is an NXN matrix, u is an eigenvector of matrix A and $\lambda$ is an eigenvalue associated with u. In one embodiment, matrix A may be the covariance matrix of the gradient field as set forth above. In an alternative embodiment, matrix A may be the Hessian matrix for voxels in a region of an X-ray image. The eigenvalues and associated eigenvectors of matrix A may be determined analytically or by any of various iterative methods such as the Jacobi method, Gauss-Seidel, Singular Value Decomposition (SVD), or by any other method suitable for obtaining the eigenvalues and/or eigenvectors of a matrix.

In step 320', the eigenvalues associated with the principal directions of variation of the gradient information 315 of a region of interest 305 are determined. It should be appreciated that the magnitude of each eigenvalue is related to the "significance" of the associated eigenvector. For example, the largest eigenvalue will be associated with an eigenvector indicating the predominant direction of variation in the gradient field. The second largest eigenvalue will be associated with an eigenvector indicating the second most significant direction of variation and so on. Accordingly, the relationship between the magnitudes of the obtained eigenvalues may be one measure of determining characteristics of the gradient field of a region of interest.

In step 330', the eigenvalues associated with the eigenvectors of matrix A are analyzed to determine if the gradient information from which the characteristic information was derived is similar to that typical of certain objects of interests. For example, the eigenvalues may be compared to one another in order to measure the characteristic variation of the gradient information.

Various methods of comparing eigenvalues derive from Applicant's appreciation that sheet like objects tend to produce gradient information that varies predominantly in a single direction. For example, a covariance matrix computed as described above and derived from 3D X-ray image data may produce eigenvalues $\lambda_1$, $\lambda_2$, $\lambda_3$ that, when ordered by magnitude, are associated with the first principal direction of variation, the second principal direction of variation and the third principal direction of variation, respectively. Accordingly, a sheet explosive may produce a relatively large $\lambda_1$ and less significant $\lambda_2$ and $\lambda_3$ values. Such an arrangement of eigenvalues indicates that the underlying material has a gradient field that tends to vary predominantly in a single direction.

In one embodiment, a ratio of the largest eigenvalue to the smallest eigenvalue is computed, wherein a relatively large ratio indicates a predominant direction of variation that has been determined by Applicant to be characteristic of sheet explosives. In another embodiment, a ratio of the largest eigenvalue to a median eigenvalue may be determined and evaluated to characterize gradient information. In yet another embodiment, a ratio of the largest eigenvalue to the product of the other eigenvalues may be used as a measure to determine whether the gradient field is likely to have been derived from X-ray image data of a sheet-like object.

It should be appreciated that various comparisons and ratios of eigenvalues often are compared to a threshold value indicating a discriminating line or range for such comparisons. Threshold values are often determined empirically to provide desired results or to achieve a desired sensitivity and may depend on the operating characteristics of a particular inspection system such as resolution, dynamic range of intensity values in an image, scaling and quantization, etc.

As described in further detail below, the particular measure (e.g., the particular eigenvalue comparison) employed may depend in part on the scale of the region of interest from which the gradient information is obtained. For example, a certain measure may be more appropriate for gradient analysis at a relatively local scale (e.g., at the scale of a voxel neighborhood) while another measure may be more appropriate for gradient analysis at a relatively global scale (e.g., at the scale of an object). It should be appreciated that while eigenvalue comparison has been described in connection with three eigenvalues, more or fewer eigenvalues may be compared and/or analyzed. The number of the eigenvalues available and/or used may depend on the dimensionality of the X-ray image data and the characteristic of the gradient information being sought for purposes of discriminating a class of objects.

Raw X-ray image data generally indicates a scalar value related to a density of material found at a certain discrete location in space. However, the individual voxels may not be otherwise associated. Accordingly, the various objects giving rise to the image data must be inferred from the individual voxels comprising the X-ray image. The process of grouping pixels or voxels together that presumably belong to the same object is referred to as segmentation. Conventionally, an image may be segmented by grouping together connected or unconnected voxels having similar intensity values. For example, a neighbor to a particular voxel may be considered as resulting from the same object if its intensity value does not deviate from its neighbor beyond some set threshold. Methods such as thresholding, connected component labeling, region growing, image statistics, etc., have been employed for segmentation based on the relative intensity values of voxels in an image. However, image segmentation based on intensity measurements alone is prone to error.

Applicant has identified and appreciated that gradient analysis may be employed to discriminate between objects of interest and various other objects (e.g., non-threat objects). In particular, Applicant has developed various methods that employ gradient analysis at a local and/or global scale to facilitate segmentation and/or discrimination of threat objects from non-threat objects.

Global gradient analysis refers to ascertaining the characteristics of gradient information over a relatively large area. In particular, global gradient analysis typically determines the gradient behavior of a region of interest in an image on an object basis (e.g., gradient characteristics of an entire segmented object). For example, objects segmented by other methods may undergo global gradient analysis to determine if the gradient field of the object has characteristics generally belonging to a particular class of objects of interest (e.g., a sheet explosive).

Figure 7:
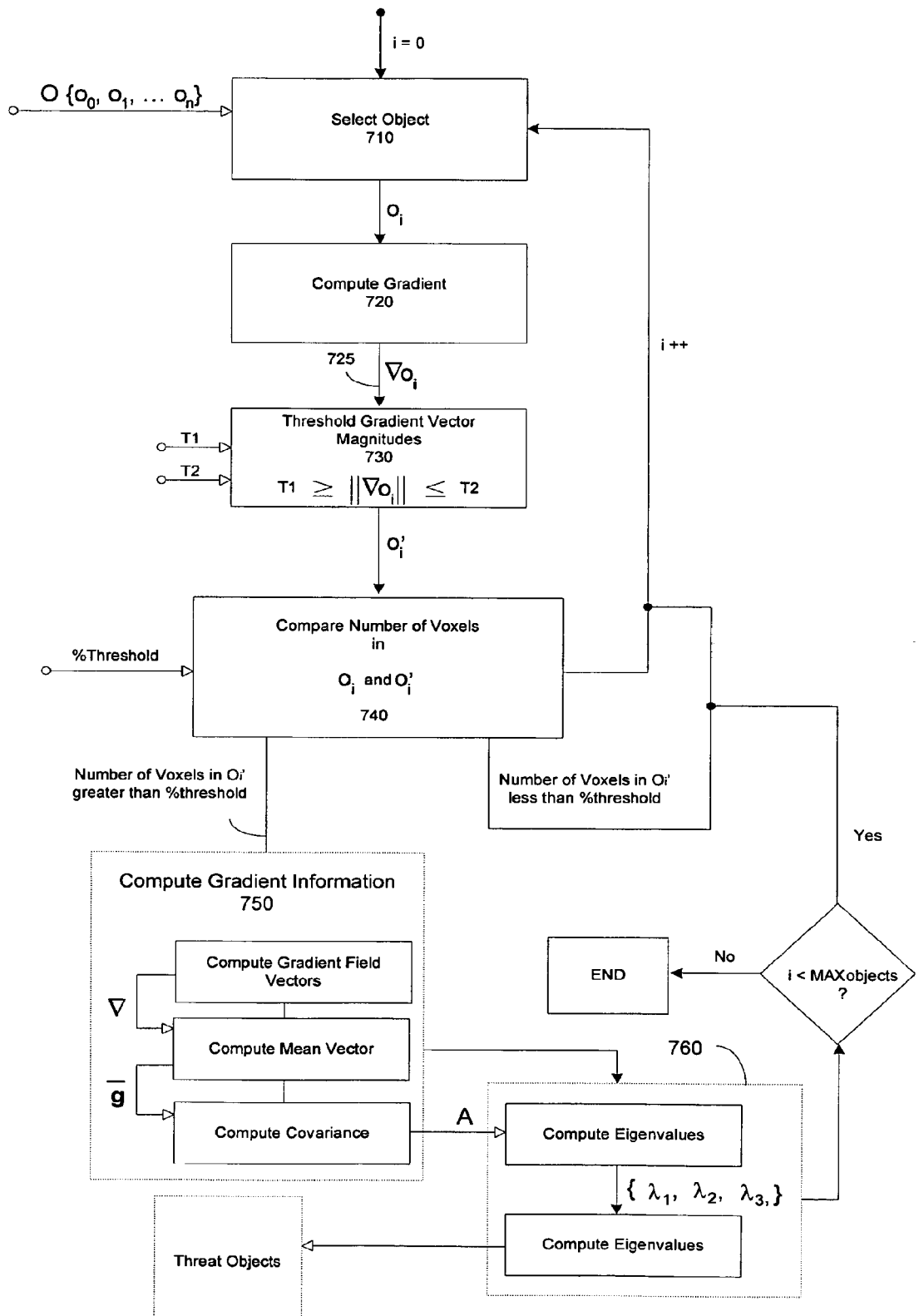
FIG. 7 illustrates a method of employing global gradient analysis to discriminate certain threat objects from non-threat objects, in accordance with one embodiment of the present invention.

FIG. 7 illustrates one aspect of the present invention that employs global gradient analysis to discriminate sheet like objects from other bulk and/or non-threat objects. In step 710, a first object $o_i$ is selected from a set of objects O provided, for example, from a conventional segmentation algorithm. The objects in set O may be objects identified as potential threat items. For example, in conventional detection algorithms, any set O other than the empty set may raise an alarm to indicate that at least one threat object was detected in the baggage. However, conventional algorithms tend to have unacceptable false alarm rates. Accordingly, each object $o_i$ in set O may be further analyzed to facilitate the elimination of false positives.

Object $o_i$ may be represented as a bounding box that encloses the particular object or objects being analyzed. For example, in a 3D image, an origin pixel (e.g., a corner of the bounding box, a center of the bounding box, etc.) may be specified along with the dimensions of the bounding volume that encloses the one or more objects. An object may be any collection of indicated pixels or voxels classified as belonging to a same entity, class or set.

In step 720, the gradient is calculated for each voxel in object $o_i$ to provide gradient field 725 for object $o_i$. In step 730, gradient vectors of gradient field 725 are thresholded on their magnitude. For example, a range bounded by a lower threshold T1 and higher threshold T2 may be designated such that voxels having gradient vectors outside the range are discarded. For example, T1 may be set to a number between 50-500 and T2 may be set to a number between 700-10000. The actual threshold values used may depend on the type of target material and the level of desired sensitivity, the dynamic range of pixel or voxel values, etc. Voxels having gradient vector magnitudes within the specified range may be grouped together to form a new object $o_i'$.

In step 740, the number of voxels in object $o_i'$ may be compared to the number of voxels in object $o_i$. In some embodiments, unless the number of voxels in object $o_i'$ comprise a predetermined percentage of the number of voxels in the original object $o_i$, the object is eliminated and not considered further. For example, in one embodiment, the number of voxels that meet the gradient vector magnitude thresholds in step 730 must represent at least 40% of the original object $o_i$, otherwise object $o_i'$ is eliminated (i.e., identified as a non-threat item or as part of the noise).

The term "eliminated" or "discarded" with respect to objects, voxels, regions, etc., refers to removing the object, voxel or region from further consideration regarding its being associated with threat objects, prohibited materials or any of other various subject matter of interest.

In step 750, gradient information may be obtained for object $o_i'$. For example, gradient field vectors may be computed for each of the voxels comprising object $o_i'$. A mean vector may be computed from gradient field vectors determined over the entire object and subsequently used to determine a covariance matrix associated with object $o_i'$.

In step 760, the eigenvalues associated with the eigenvectors of the covariance matrix A are computed and compared. For example, in a 3D X-ray image, eigenvalues $\lambda_1$, $\lambda_2$, and $\lambda_3$ may be available. Sheet-like objects will tend to have eigenvalues that are small relative to a predominant eigenvalue, while non-sheet objects generally do not share this characteristic.

According to one embodiment, the ratio of the smallest eigenvalue (e.g., $\lambda_3$) to the product of the first and second largest eigenvalues (e.g., $\lambda_1$, $\lambda_2$) must be smaller than a predetermined threshold, for example, a threshold value of 1.0. Some embodiments may require eigenvalue relationships to meet other characteristics such as the requirement that a ratio of the largest eigenvalue to the smallest eigenvalue be greater than a certain predetermined threshold.

For example, a relatively less selective measure may be implemented by requiring that the ratio of the largest eigenvalue to the smallest eigenvalue be greater than a desired value in a range from 1 to 3. Increased selectivity may be achieved by requiring that the largest eigenvalue to the smallest eigenvalue be greater than a desired value in a range from 3 to 5. Similarly, strong selectivity may be achieved by requiring that the ratio of the largest eigenvalue to the smallest eigenvalue be greater than 5. Such a predetermined threshold may depend not only on desired selectivity but also on the volume (e.g., the number of voxels) in object $o_i'$, that is, the threshold may be made to vary with the number of voxels in a segmented region.

Figure 8:
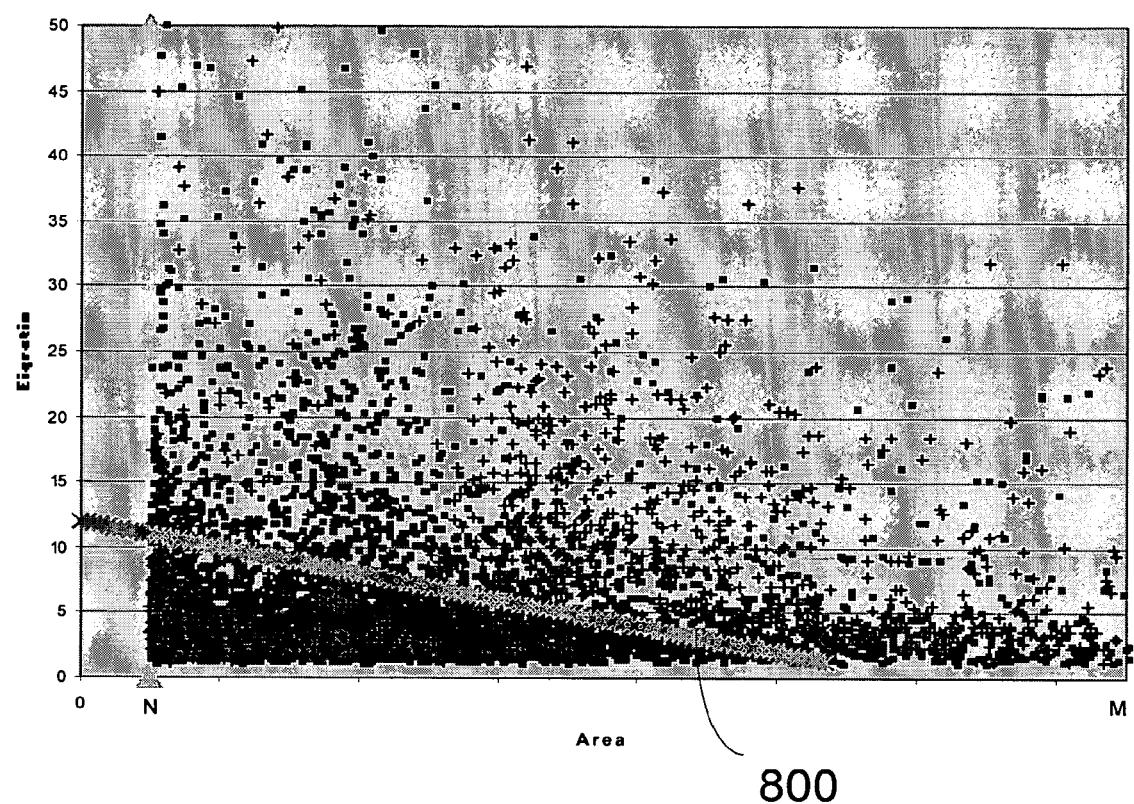
FIG. 8 illustrates ratios of eigenvalues for a variety of different area objects in an images of articles of baggage.

For example, FIG. 8 graphically illustrates the largest to smallest eigenvalue ratio for objects ranging in area from N voxels to M voxels. The objects were obtained from the Logan Summer International False Alarm rate. As shown, it may be useful to tailor threshold values to voxel size.

If object $o_i'$ meets the various requirements of the foregoing steps, it may be considered as a threat object and an alarm may be raised to indicate that prohibited materials may be present in the associated baggage. The above described procedure may be repeated until each object in set O has been analyzed. In some embodiments, the object may undergo further analysis to further reduce the false alarm rate.

It should be appreciated that global gradient analysis may be used to determine whether an object exhibits any of various gradient characteristics that match characteristics of objects, materials and/or subject matter for which detection is desired. As described above, characteristics of both gradient magnitude and gradient variation were employed to discriminate sheet objects from non-sheet objects. However, other measures may be suitable to further discriminate between threat and non-threat objects. In general, any characteristic of an object's gradient information suitable for discriminating at least in part a certain class of objects may be used, as the invention is not limited in this respect.

Applicant has further identified and appreciated that gradient analysis may be employed at a local scale (i.e., local gradient analysis) to determine if small regions exhibit certain gradient characteristics identified as generally belonging to a certain class of objects for which detection is desired. In one embodiment, local gradient analysis is employed to determine whether individual voxels belong to a threat object class based on the characteristics of a generally small neighborhood.

Figure 9:
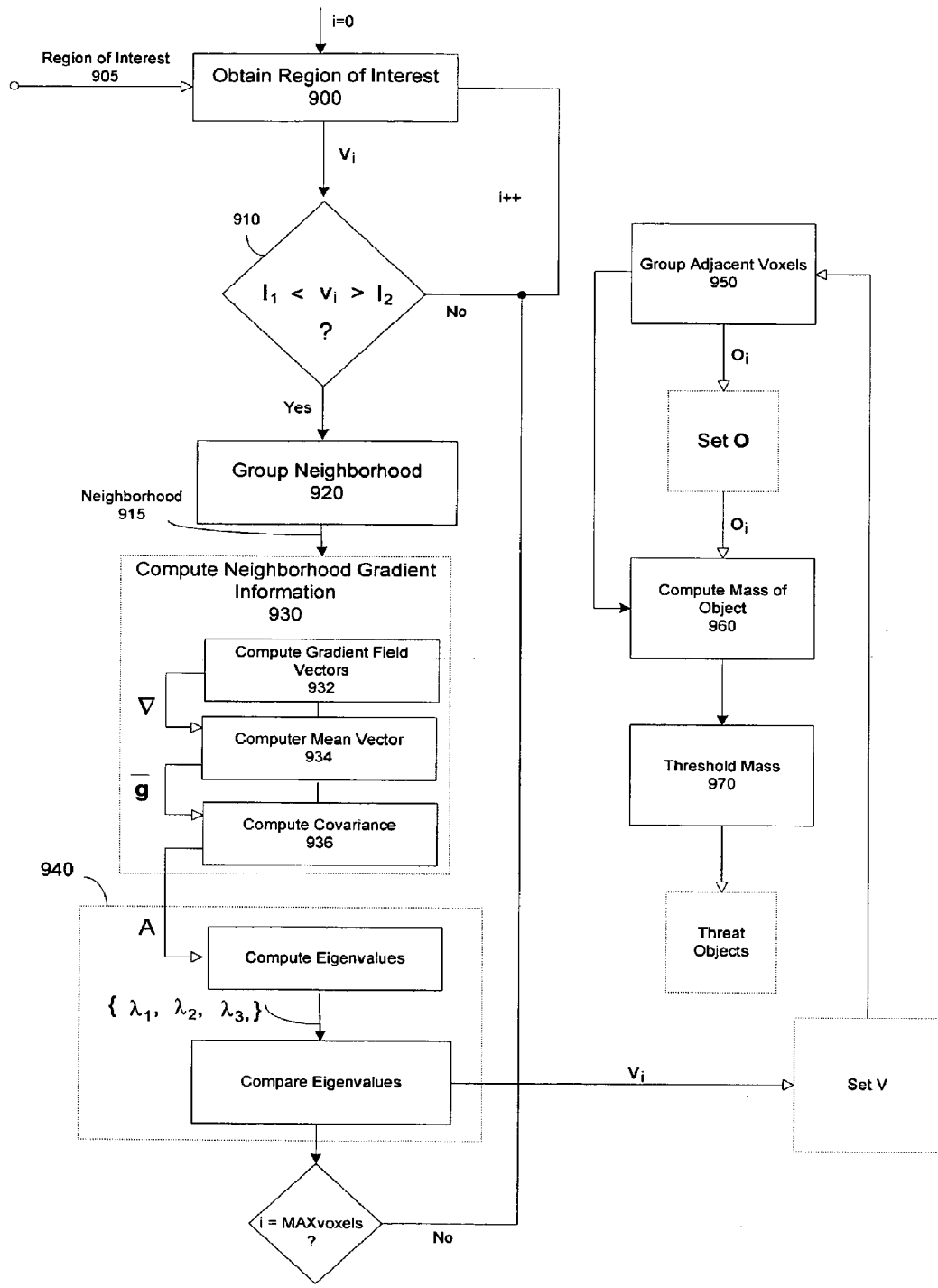
FIG. 9 illustrates a method of employing local gradient analysis to discriminate certain threat objects from non-threat objects, in accordance with one embodiment of the present invention.

FIG. 9 illustrates one embodiment of local gradient analysis according to the present invention wherein each target voxel in a region of interest 905, is analyzed for characteristic gradient variation. The term "target" when referring to a group of similar items (e.g., pixels, voxels or objects) refers generally to the particular item or entity currently under consideration (e.g., the current item being processed, analyzed or otherwise examined).

Region of interest 905 may be an entire X-ray image or any portion of the X-ray image. In step 910, a target voxel $v_i$ of region of interest 905 is obtained for analysis. Initially, the target voxel is tested against a specified range of intensity values. For example, before any further computation is expended on the voxel, it may be first determined whether the density of the material giving rise to the voxel is characteristic of a particular class of objects or subject matter being detected. For example, explosives tend to have intensity values in the range of 300-1800. Once the voxel is determined to be within the specified range, its gradient characteristics may then be determined.

In step 920, an L×M×N region of voxels or neighborhood 915 around voxel $v_i$ may be grouped together. For example, the region may be a cube having equal dimensions, for instance, a 5×5×5 voxel neighborhood around voxel $v_i$ may be grouped together for further analysis. Any size neighborhood of any dimension may be used.

In step 930, gradient information is obtained from neighborhood 915 and characteristics of the gradient information determined and analyzed to facilitate determining whether voxel $v_i$ belongs to a class of objects or subject matter for which detection may be required (e.g., sheet explosives). In step 932, a neighborhood gradient field 925 is obtained by any method suitable for determining a discrete gradient (e.g., first partial derivatives along each of the dimensions of the X-ray image) of a volume (or avia) of voxels (i.e., neighborhood 915). In step 934, a mean vector 935 of the neighborhood gradient field 925 may be computed to facilitate determining covariance matrix 945 of neighborhood gradient 925 in step 936. Accordingly, gradient information 955 may be obtained.

This gradient information may be used to extract characteristics of the gradient field of the neighborhood. In step 940, available eigenvalues associated with eigenvectors of covariance matrix 945 are determined and compared. In one embodiment, a first ratio of the largest eigenvalue to the smallest eigenvalue is compared to a first threshold and a second ratio of the largest eigenvalue to the median eigenvalue is compared to a second threshold. If the first ratio and/or the second ratio do not exceed respective thresholds, voxel $v_i$ may be eliminated.

For example, for relatively low selectivity, the first threshold value may be set in a range from 6 to 8 and the second threshold value may be set in a range from 2 to 4. For increased selectivity, the first threshold value may be set in a range from 9 to 12 and the second threshold value may be set in a range from 5 to 7. For highly selective measures, the first threshold value may be set to greater than 12 and the second threshold value may be set to greater than 7, for example, 15 and 8, respectively. It should be appreciated that as selectivity increases, the detection rate decreases as does the false positive rate. Threshold values may be chosen to suit particular applications and to optimize for different target subject matter. In addition, threshold value may differ depending on the capabilities of the X-ray equipment and characteristics of the resulting images.

It should be appreciated that other measures and/or eigenvalue comparisons alone, in combination and/or in combination with the comparisons described above may be used to determine if the neighborhood of voxel $v_i$ exhibits gradient characteristics typical of a class of objects being detected.

If requirements of the eigenvalue comparison are met, voxel $v_i$ is deemed to be associated with subject matter of interest, for example, a sheet-like object and may be added to a set of voxels V exhibiting gradient characteristics of the subject matter of interest. This process may be repeated until a neighborhood of each voxel $v_i$ in region of interest 905 has been characterized and/or analyzed for gradient characteristics of any of various objects being detected.

It should be appreciated that the method described in the foregoing examines a neighborhood of a voxel to determine if the voxel should be considered as arising from an object, material and/or subject matter being detected, for example, a sheet explosive. If so, the voxel may be included in a collection of pixels representing alarm and/or threat objects.

However, each voxel has been examined without consideration of proximity (except with respect to determining the local gradient behavior). Stated differently, the voxels grouped together in set V may be disconnected, form a number of separate objects, or in some cases may form small clusters of voxels arising from noise. That is, the voxels in set V may represent more than one object and/or may be located in non-connected regions of the X-ray image. Accordingly, various grouping schemes may subsequently be employed to analyze the relationship between the voxels in set V remaining after local gradient analysis in order to identify potential alarm objects.

For example, in step 950, connected component labeling (CCL) may be used to group connected voxels together. For example, voxels in set V adjacent (i.e., connected) to one another may be grouped together in the same object. Adjacency may be determined as desired.

For example, vertical and horizontal adjacency may be considered in determining connectivity. In addition, diagonal adjacency may also be considered. Accordingly, the various voxels in set V may be collected and labeled as a plurality of objects $o_i$ in set O.

The objects in set O may be further analyzed to determine if each respective object is likely to have arisen from threat material in the baggage. For example, in step 960, the volume may be computed for each of the objects in set O (e.g., by counting the number of voxels included in the object). From the intensity values of the voxels and the volume calculation, the mass of the object may be determined.

In step 970, objects that fail to meet a predetermined mass-density threshold (e.g., the 75% threat weight) may be eliminated. The remaining objects are collected to form a set O' and may be considered to represent objects of interest and may indicate the presence of a threat object in the baggage. If the set O' is not the empty set, an alarm may be raised to indicate the presence of a threat object in the baggage. Alternatively, the objects in set O' may undergo further analysis to further reduce the likelihood of a false alarm.

As discussed in the foregoing, increased detection rates typically have an associated increase in false alarm rates. Increases in detection rates and false alarm rates often do not have a linear relationship. Incremental increases at higher detection rates typically have associated with them larger increases in false alarm rates than do lower detection rates.

Accordingly, increases at detection rates mandated by various agencies of the United States typically correspond to unacceptable increases in false alarm rates.

Applicant has identified and appreciated that various arrangements of local and global gradient analysis can be used in conjunction and/or combination to increase detection rates without incurring unacceptable false alarm rates. FIGS. 10A and 10B illustrate several embodiments of the present invention that use local and global gradient analysis to reduce the false alarm rate of conventional automatic detection methods.

In FIG. 10a, bounding volume 1010a encloses three objects 10, 20 and 30 identified as potential threat objects using any of various conventional methods 1015. Assume that only object 10 is truly a threat object in the form of a sheet explosive and that conventional algorithm 1015 generated false positives for objects 20 and 30.

In the embodiment illustrated in FIG. 10A, global gradient analysis 1025 is employed on the objects identified by method 1015 to further discriminate threat objects from non-threat objects. Objects 10, 20 and 30 may be segmented objects in a set O provided to global gradient analysis as described in connection with FIG. 7. For example, objects 10, 20 and 30 may be analyzed to determine if they exhibit sheet-like gradient characteristics at the scale of the object. Accordingly, global gradient analysis may result in the elimination of object 30 such that objects 10 and 20 remain as potential threat objects.

In order to further reduce false positive rates, local gradient analysis 1035 may be employed to further analyze the threat objects identified by global gradient analysis 1025. Each of the objects, alone or in combination, identified by global gradient analysis may be provided as a region of interest to local gradient analysis as described in connection with FIG. 9. Local gradient analysis may, for instance, determine that object 20 belongs to a class of non-threat objects and identify object 10 as the sole threat object in the baggage. For example, local gradient analysis may determine that only object 10 exhibits local gradient characteristics typical of sheet explosives.

In another embodiment illustrated in FIG. 10b, conventional detection method 1015 may identify objects 20, 30 and 40 as potential threat objects in an X-ray image of an article of baggage. Assume that the baggage containing these objects is free from any threat objects and/or prohibited material. Accordingly, conventional method 1015 generates three false positives and would raise a false alarm. However, local gradient analysis 1035 may be applied to the objects identified by the conventional method 1015 to reduce the number of false positives that are generated. For example, each object identified by method 1015 may be provided to local gradient analysis as a region of interest or bounding volume 1010b may be provided to local gradient analysis 1035 as described in connection with FIG. 9. Local gradient analysis may, for example, eliminate object 20 and 30 for the absence of local sheet-like characteristics.

In order to further reduce false positives, the objects identified by local gradient analysis as potential threat items may be further analyzed by global gradient analysis 1025. For example, the objects (e.g., object 40) meeting the requirements of local gradient analysis may be provided to global gradient analysis to be analyzed on an object basis. Global gradient analysis may determine that some or all of the objects identified by local gradient analysis were false positives. Accordingly, global gradient analysis may eliminate object 40 such that no alarm is raised and the baggage is correctly determined as containing only innocuous material.

Figure 11:
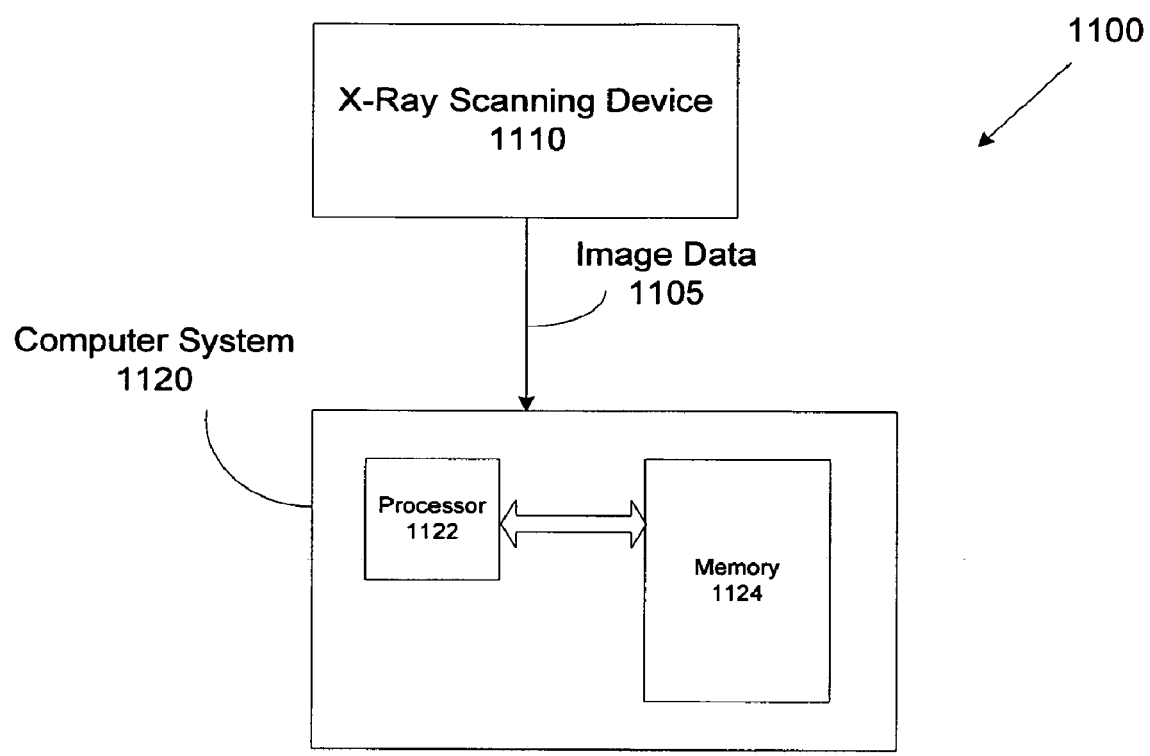
FIG. 11 illustrates one embodiment of an X-ray imaging device suitable for implementing various aspects of the present invention.

FIG. 11 illustrates a block diagram of one embodiment of a system 1100 suitable for practicing various aspects of the present invention. System 1100 includes an X-ray scanning device 1110 and computer system 1120. X-ray scanning device 1110 may be any device capable of acquiring image data of an object of interest, such as baggage. X-ray scanning devices may be designed with varying capabilities, such as resolution, scan speed and scan path (e.g., circular, helical, etc.), may employ a variety of radiation emission technologies, such as cone beam, fan beam and pencil beam technologies, and may provide data of different types such as CT or laminographic data. Any X-ray scanning device providing image data may be suitable, as aspects of the invention are not limited to image data obtained from any particular type, arrangement and/or capability.

Computer system 1120 may include a processor 1122 connected to one or more memory devices including memory 1124. Memory 1124 may be any of various computer-readable media capable of storing electronic information and may be implemented in any number of ways. Memory 1124 may be encoded with instructions, for example, as part of one or more programs that, as a result of being executed by processor 1120, instruct the computer to perform one or more of the methods or functions described herein, and/or various embodiments, variations and combinations thereof.

Computer system 1120 may be, for example, a personal computer (PC), work station, general purpose computer, or any other computing device. Computer system 1120 may be integrated into X-ray scanning device 1110 or may be a separate stand alone system, either proximate to or remote from X-ray scanning device 1110. For example, computer system 1120 may be connected to X-ray scanning device 1110 over a network, connected to multiple scanning devices or may not be connected to any X-ray scanning device at all. In this last respect, computer system 1120 may operate on image data previously stored in memory 1124, or may obtain the image data from some other location, e.g., another computer system, over a network, via transportable storage medium, etc. It should be appreciated that any computing environment may be used, as the aspects of the invention described herein are not limited to use with a computer system of any particular type or implementation.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed function. The one or more controller can be implemented in numerous ways, such as with dedicated hardware, or with general purpose hardware (e.g., one or more processor) that is programmed using microcode or software to perform the functions recited above.

It should be appreciated that the various methods outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code.

In this respect, it should be appreciated that one embodiment of the invention is directed to a computer readable medium (or multiple computer readable media) (e.g., a computer memory, one or more floppy discs, compact discs, optical discs, magnetic tapes, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

It should be understood that the term "program" is used herein in a generic sense to refer to any type of computer code or set of instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

It should be appreciated that global and/or local gradient analysis may be used to improve segmentation and/or discrimination results and may be used alone, in combination, or in a variety of arrangements not specifically discussed in the embodiments described in the foregoing and is therefore not limited in its application to the details and arrangement of components set forth in the following description or illustrated in the drawings. The invention is capable of other embodiments and of being practiced or of being carried out in various ways. Various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

What is claimed is:

1. A method of detecting a presence or an absence of at least one sheet explosive in an article of baggage containing a plurality of non-threat items from at least one x-ray image of the article of baggage, the method comprising acts of:

determining a gradient field for at least a portion of the at least one image, the gradient field including a vector quantity indicating a gradient direction and gradient magnitude at each location for at least the portion of the at least one image;

determining at least one characteristic of the gradient field including determining principal directions of variation of the gradient field;

performing at least one comparison of the principal directions of variation to determine whether the at least one characteristic is consistent with characteristics of sheet explosives; and determining whether the at least one sheet explosive is present amongst the plurality of non-threat objects based, at least in part, on the at least one comparison.

2. The method of claim 1, wherein the act of determining at least one characteristic includes an act of determining a covariance matrix associated with the gradient field.

3. The method of claim 2, wherein the act of determining at least one characteristic includes an act of determining a plurality of eigenvalues associated with respective eigenvectors of the covariance matrix, and wherein the act of performing at least one comparison includes an act of performing at least one comparison of the plurality of eigenvalues.

4. The method of claim 3, wherein performing at least one comparison includes an act of determining at least one ratio between the plurality of eigenvalues.

5. The method of claim 4, wherein the act of determining the plurality of eigenvalues includes an act of determining a first eigenvalue, a second eigenvalue and a third eigenvalue respectively ordered according to decreasing magnitude.

6. The method of claim 5, wherein the act of determining at least one ratio includes an act of determining at least one of a first ratio of the first eigenvalue to the third eigenvalue, a second ratio of the first eigenvalue to the second eigenvalue, and a third ratio of the third eigenvalue to a product of the first and second eigenvalue, and wherein the act of determining whether the portion of the at least one image is associated with the subject matter of interest includes comparing at least one of the first ratio, the second ratio and the third ratio to a predetermined threshold.

7. The method of claim 1, wherein the portion of the at least one x-ray image includes a region of interest having a plurality of voxels.

8. The method of claim 7, further comprising an act of forming a first set of voxels from voxels in the region of interest based on the at least one characteristic.

9. The method of claim 8, wherein the act of determining the gradient field includes an act of determining for each target voxel in the region of interest a gradient field of a neighborhood of the target voxel.

10. The method of claim 9, further comprising an act of determining a covariance matrix associated with the gradient field.

11. The method of claim 10, further comprising an act of determining a plurality of eigenvalues associated with respective eigenvectors of the covariance matrix.

12. The method of claim 11, further comprising acts of:
performing at least one comparison of the plurality of eigenvalues; and
adding the target voxel to the first set of voxels depending on the at least one comparison.

13. The method of claim 12, wherein the act of performing at least one comparison includes an act of determining from the plurality of eigenvalues, a first eigenvalue having a greatest magnitude to a second eigenvalue having a least magnitude and a second ratio of a first eigenvalue to a third eigenvalue having a magnitude between the first eigenvalue and the second eigenvalue.

14. The method of claim 13, wherein the act of forming the first set of voxels includes acts of:
comparing the first ratio to a first threshold value; and
adding the target voxel to the first set of voxels when the first ratio exceeds the first threshold.

15. The method of claim 13, wherein the act of forming the first set of voxels includes acts of:
comparing the first ratio to a first threshold value;
comparing the second ratio to a second threshold value; and
adding the target voxel to the first set of voxels when the first ratio exceeds the first threshold value and the second ratio exceeds the second threshold value.

16. The method of claim 12, further comprising an act of forming a first set of objects from the first set of voxels, each object in the first set of objects being comprised of voxels from the first set of voxels that are respectively connected.

17. The method of claim 16, further comprising an act of determining at least a mass of each object in the first set of objects.

18. The method of claim 17, further comprising an act of comparing each mass to a mass threshold value, and wherein the act of determining whether the portion is associated with the subject matter of interest includes an act of determining each object having a mass exceeding the mass threshold as including the subject matter of interest 19. The method of claim 1, wherein the portion of the at least one x-ray image includes a first segmented object having a plurality of voxels, and wherein the act of determining the gradient field includes an act of determining a gradient field for the first segmented object.

20. The method of claim 19, wherein the act of determining gradient field includes determining a gradient field vector for each of the plurality of voxels.

21. The method of claim 20, wherein the act of determining at least one characteristic includes an act of comparing a magnitude of each of the plurality of gradient field vectors with a first and second threshold value.

22. The method of claim 21, further comprising an act of grouping together each voxel having a magnitude greater than the first threshold value and less than the second threshold value to form a second segmented object.

23. The method of claim 22, further comprising acts of:
comparing a number of voxels in the second segmented object to a number of voxels in the first segmented object; and
eliminating the second segmented object when the number of voxels in the second segmented object is less than a predetermined percentage of the number of voxels in the first segmented object.

24. The method of claim 23, further comprising an act of determining a mean vector from the plurality of gradient field vectors of voxels in the second segmented object.

25. The method of claim 24, wherein the act of determining gradient field includes an act of determining a covariance matrix of the gradient field of the second segmented object based on the mean vector.

26. The method of claim 25, wherein the act of determining at least one characteristic includes an act of determining a plurality of eigenvalues associated with eigenvectors of the convariance matrix, and wherein the act of determining whether the portion is associated with the subject matter of interest includes an act of performing at least one comparison of the plurality of eigenvalues.

27. The method of claim 26, wherein the act of determining at least one characteristic includes an act of determining at least one of a first ratio of a greatest magnitude eigenvalue of the covariance matrix to a least magnitude eigenvalue of the convariance matrix and a second ratio of the least magnitude eigenvalue of the covariance matrix to a product of the greatest magnitude eigenvalue and a median magnitude eigenvalue of the covariance matrix.

28. The method of claim 27, wherein the act of determining whether the portion is associated with the subject matter of interest includes an act of identifying the second segmented object as including the subject matter of interest when the first ratio is less than a predetermined threshold value.

29. The method of claim 27, wherein the act of determining whether the portion is associated with an object of interest includes an act of identifying the second segmented object as an object of interest when the first ratio is less than a first predetermined threshold value and the second ratio is less than a second predetermined threshold value.

30. A method of detecting a presence or an absence of one or more sheet explosives in an article of baggage from at least one image of the article of baggage, the method comprising acts of:
obtaining a gradient field of at least a portion of the at least one image, the gradient field including a vector quantity indicating a gradient direction and a gradient magnitude at each location for at least the portion of the at least one image;

determining at least one characteristic of the gradient information indicative of a sheet explosive including determining principal directions of variation of the gradient information; and determining whether the portion of the at least one image includes at least part of a sheet explosive based on the at least one characteristic including performing at least one comparison of the principal directions of variation.

31. The method of claim 30, wherein the act of obtaining gradient information includes an act of determining at least one Hessian matrix associated with the portion of the at least one image.

32. The method of claim 31, wherein the act of determining at least one characteristic of the gradient information includes an act of determining a set of eigenvalues associated with respective eigenvectors of the at least one Hessian matrix.

33. A computer readable medium encoded wit a program for execution on at least one processor, the program, when executed on the at least one processor, performing a method of detecting a presence or an absence of at least one sheet explosive in an article of baggage containing a plurality of non-threat objects from at least one x-ray image of the article of baggage, the method comprising acts of:

obtaining a gradient field of at least a portion of the at least one image, the gradient field including a vector quantity indicating a gradient direction and gradient magnitude at each location for at least the portion of the at least one image;

determining at least one characteristic of the gradient field including determining principal directions of variation of the gradient field;

performing at least one comparison of the principal directions of variation to determine whether the at least one characteristic is consistent with characteristics of sheet explosives; and determining whether the at least one sheet explosive is present amongst the plurality of non-threat objects based, at least in part, on the at least one comparison.

34. The computer readable medium of claim 33, wherein the portion of the at least one image includes a region of interest having a plurality of voxels.

35. The computer readable medium of claim 34, wherein the act of determining whether the portion is associated with the subject matter of interest includes an act of forming a first set of voxels from voxels in the region of interest based on the at least one characteristic.

36. The computer readable medium of claim 35, wherein the act of determining gradient information includes an act of determining for each target voxel in the region of interest a gradient field of a neighborhood of the voxel.

37. The computer readable medium of claim 36, further comprising an act of determining principal directions of variation associated with the gradient field.

38. The computer readable medium of claim 37, further comprising acts of:

performing at least one comparison of the principal directions of variation; and adding the target voxel to the first set of voxels depending on the at least one comparison.

39. The computer readable medium of claim 38, further comprising an act of forming a first set of objects from the first set of voxels, each object in the first set of objects being comprised of voxels from the first set of voxels that are respectively connected.

40. The computer readable medium of claim 39, further comprising an act of determining at least a mass of each object in the first set of objects.

41. The computer readable medium of claim 40, further comprising an act of comparing each mass to a mass threshold value.

42. The computer readable medium of claim 41, wherein the act of determining whether the portion is associated with the subject matter of interest includes an act of determining each object having a mass exceeding the mass threshold as including the subject matter of interest.

43. The computer readable medium of claim 33, wherein the portion of the at least one image includes a first segmented object having a plurality of voxels.

44. The computer readable medium of claim 43, wherein the act of obtaining gradient information includes an act of determining a gradient field for the first segmented object.

45. The computer readable medium of claim 44, wherein the act of determining at least one characteristic of the gradient information includes an act of determining principal directions of variance for the gradient field.

46. The computer readable medium of claim 43, wherein the act of determining gradient information includes determining a gradient field vector for each of the plurality of voxels.

47. The computer readable medium of claim 46, wherein the act of determining at least one characteristic includes an act of comparing a magnitude of each of the plurality of gradient field vectors with a first and second threshold value.

48. The computer readable medium of claim 47, further comprising an act of grouping together each voxel having a magnitude greater than the first threshold value and less than the second threshold value to form a second segmented object.

49. The computer readable medium of claim 48, further comprising acts of:

comparing a number of voxels in the second segmented object to a number of voxels in the first segmented object; and eliminating the second segmented object when the number of voxels in the second segmented object is less than a predetermined percentage of the number of voxels in the first segmented object.

50. The computer readable medium of claim 33, in combination with the at least one processor.

51. The combination of claim 50, in further combination with at least one X-ray scanning device, the at least one X-ray scanning device capable of providing image data to the at least one processor.

52. The combination of claim 51, wherein the at least one X-ray scanning device includes at least one X-ray computed tomography (CT) device, and wherein the at least one image includes at least one CT image.

53. The combination of claim 51, wherein the at least one X-ray scanning device includes at least one X-ray detection device adapted to scan baggage.

54. An apparatus adapted to detect a presence or an absence of at least one sheet explosive in an article of baggage containing a plurality of non-threat objects from at least one x-ray image of the article of baggage, the apparatus comprising:

at least one input adapted to receive the at least one image; and at least one controller, coupled to the at least one input, the at least one controller adapted to obtain a gradient field of at least a portion of the at least one image, the gradient field including a vector quantity indicating a gradient direction and gradient magnitude at each location for at least the portion of the at least one image, the at least one controller farther adapted to determine at least one characteristic of the gradient field including principal directions of variation of the gradient field, and to perform at least one comparison of the principal directions of variation to determine whether the at least one characteristic is consistent with sheet explosives to determine whether the at least one sheet explosive is present amongst the plurality of non-threat objects based, at least in part, on the at least one comparison.

55. The apparatus of claim 54, wherein the at least one controller comprises means for obtaining gradient information of at least the portion of the at least one image, means for determining the at least one characteristic of the gradient information, and means for determining whether the portion of the at least one image is associated with the at least one sheet explosive based on the at least one characteristic.

56. The method of claim 30, wherein the act of determining whether the portion of the at least one image is associated with the one or more sheet explosives includes an act of determining whether the gradient information of the portion of the at least one image varies predominantly in one general direction relative to other directions.

57. The method of claim 30, wherein the act of determining the at least one characteristic of the gradient information includes an act of determining principal directions of variation of the gradient information of the portion of the at least one image, and wherein the act of determining whether the portion of the at least one image is associated with one or more sheet explosives includes an act of identifying a predominant principal direction of variation.

58. A method of detecting a presence or an absence of one or more sheet explosives in an article of baggage from at least one image of the article of baggage, the method comprising acts of:

obtaining gradient information of at least a portion of the at least one image;

determining at least one characteristic of the gradient information indicative of a sheet explosive including determining principal directions of variation of the gradient information of the portion of the at least one image, wherein determining the principal directions includes determining eigenvectors representing the principal directions of variation of the gradient information, the predominant principal direction of variation corresponding to an eigenvector having a greatest magnitude; and determining whether the portion of the at least one image includes at least part of a sheet explosive based on the at least one characteristic including comparing the eigenvectors to determine whether the relative magnitudes associated with the eigenvectors is characteristic of sheet explosives.

59. The method of claim 30, further comprising an act of segmenting the image into a plurality of regions, each of the plurality of regions including voxels that meet a first predetermined criteria, and wherein the act of determining gradient information includes an act of determining gradient information for each of the plurality of regions.

60. The method of claim 59, wherein the at least one image is segmented such that each of the plurality of regions is formed from voxels that meet a selected intensity threshold requirement and wherein each voxel in each respective region is adjacent to at least one other voxel in the region, and wherein a region in the plurality of regions is determined to contain a sheet explosive when principal directions of variation of the region meet a second predetermined criteria.

61. The method of claim 59, wherein the at least one image is segmented such that each of the plurality of regions is formed from voxels that meet a first gradient variation requirement local to each voxel and wherein each voxel in each respective region is adjacent to at least one other voxel in the region, and wherein a region in the plurality of regions is determined to contain a sheet explosive when the region meets a second gradient variation requirement global to the region.

* * * * *

UNITED STATES PATENT AND TRADEMARK OFFICE
CERTIFICATE OF CORRECTION

PATENT NO. : 7,613,316 B2
APPLICATION NO. : 10/896753
DATED : November 3, 2009
INVENTOR(S) : Mahdavieh It is certified that error appears in the above-identified patent and that said Letters Patent is hereby corrected as shown below:

In the Claims:

In claim 13, line 41, please replace "a first eigenvalue" with -- a first ratio of a first eigenvalue --;

In claim 18, line 4, after "interest" please insert -- . --;

In claim 20, line 11, please replace "gradient" with -- the gradient --;

In claim 25, line 33, please replace "gradient" with -- the gradient --;

In claim 33, line 20, please change "wit" to -- with --;

In claim 35, line 47, please replace "subject matter of interest" with -- at least one sheet explosive --;

In claim 54, line 2, please replace "farther" with -- further --;

In claim 55, line 12, please replace "gradient information" with -- the gradient field --;

In claim 55, line 15, please replace "information" with -- field --.

Signed and Sealed this

Fifth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,613,316 B2
APPLICATION NO. : 10/896753
DATED : November 3, 2009
INVENTOR(S) : Mahdavieh It is certified that error appears in the above-identified patent and that said Letters Patent is hereby corrected as shown below:

In the Claims:

Column 19, In claim 13, line 41, please replace "a first eigenvalue" with -- a first ratio of a first eigenvalue --;

Column 20, In claim 18, line 4, after "interest" please insert -- . --;

Column 20, In claim 20, line 11, please replace "gradient" with -- the gradient --;

Column 20, In claim 25, line 33, please replace "gradient" with -- the gradient --;

Column 21, In claim 33, line 20, please change "wit" to -- with --;

Column 21, In claim 35, line 47, please replace "subject matter of interest" with -- at least one sheet explosive --;

Column 23, In claim 54, line 2, please replace "farther" with -- further --;

Column 23, In claim 55, line 12, please replace "gradient information" with -- the gradient field --;

Column 23, In claim 55, line 15, please replace "information" with -- field --.

This certificate supersedes the Certificate of Correction issued January 5, 2010.

Signed and Sealed this

Twenty-sixth Day of January, 2010

David J. Kappos
*Director of the United States Patent and Trademark Office*